(12) United States Patent
Markovitz, II et al.

(10) Patent No.: US 10,106,703 B2
(45) Date of Patent: Oct. 23, 2018

(54) 1K 100% SOLIDS DRY-ERASE COATING COMPOSITION

(71) Applicant: THE SHERWIN-WILLIAMS COMPANY, Cleveland, OH (US)

(72) Inventors: Frank F. Markovitz, II, Lakewood, OH (US); Brian Makowski, Berea, OH (US); Jay A. Reimann, Mentor, OH (US); Shailesh S. Shah, Westlake, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 15/604,766

(22) Filed: May 25, 2017

(65) Prior Publication Data

US 2017/0342296 A1 Nov. 30, 2017

Related U.S. Application Data

(60) Provisional application No. 62/342,225, filed on May 27, 2016.

(51) Int. Cl.
| | | |
|---|---|---|
| *C09D 183/08* | (2006.01) | |
| *C09D 7/12* | (2006.01) | |
| *C09D 5/00* | (2006.01) | |
| *B43L 1/00* | (2006.01) | |
| *C09D 7/61* | (2018.01) | |
| *C08K 3/22* | (2006.01) | |

(52) U.S. Cl.
CPC ............ *C09D 183/08* (2013.01); *B43L 1/002* (2013.01); *C09D 5/00* (2013.01); *C09D 7/1216* (2013.01); *C09D 7/61* (2018.01); *C08K 3/22* (2013.01); *C08K 2003/2241* (2013.01)

(58) Field of Classification Search
CPC .......... C09D 5/00; C09D 7/61; C09D 7/1216; C09D 183/08; B43L 1/002
See application file for complete search history.

(56) References Cited

U.S. PATENT DOCUMENTS

2017/0342285 A1* 11/2017 Makowski ............. C09D 11/17

* cited by examiner

*Primary Examiner* — Edward J Cain
(74) *Attorney, Agent, or Firm* — James C. Scott

(57) ABSTRACT

Disclosed is a coating composition suitable for coating onto a wall or other substrate to yield a dry-erase coating. The composition may be prepared by providing an aminoalkoxysilane, and in the substantial absence of water, reacting a portion of the aminoalkoxysilane with a carbonate and reacting a portion of the aminoalkoxysilane with an epoxy compound. These reactions will result in a coating composition that comprises a mixture of alkoxysilylamines and alkoxysilylcarbamates. The coating composition can also include an alkyl amine in an amount effective to catalytically deprotect alkoxy groups to yield silanol groups, facilitating fast crosslinking.

18 Claims, No Drawings

1K 100% SOLIDS DRY-ERASE COATING COMPOSITION

This application claims benefit of U.S. Provisional Application No. 62/342,225 filed May 27, 2016, the entirety of which is hereby incorporated by reference.

TECHNICAL FIELD

The disclosure relates generally to a dry-erase coating composition suitable for many applications including coating interior wall surfaces. Upon coating an interior wall surface with the coating composition, the composition will cure to form a dry-erase coating on the interior wall surface.

BACKGROUND

Dry-erase boards, also referred to as whiteboards, have been manufactured commercially for many years. Dry-erase surfaces provide a writing surface with a non-porous character that prevents the penetration of dry-erase marker ink through the surface. Conventional dry-erase marker ink formulations include a hydrophobic, oily release agent that inhibits permanent marking or staining of the whiteboard. The non-porous nature of the whiteboard combined with the oily, quick drying marker ink in dry erase markers allow the marker ink to be easily removed from the whiteboard on the top of the hydrophobic coating, and allows the ink to be removed easily.

To manufacture a whiteboard, the manufacturer coats a dry-erase coating composition onto a substrate, and allows the substrate to dry. A number of dry-erase coating compositions are known. Traditional dry-erase coating compositions are created using two components, which must be mixed together immediately prior to coating the composition onto the substrate. Such coatings are referred to as "2K" coating compositions. Many dry-erase coating compositions are formulated using organic solvents, which impart a high level of volatile organic compounds ("VOCs"), such as ethylene glycol, formaldehyde, or benzene, many of which are hazardous. In addition, the cure time for these coating compositions can be several days. In light of these attributes, such 2K dry-erase coating compositions are intended only for professional commercial application. In addition, some known dry-erase coating compositions include isocyanate compounds or epoxies. Isocyanates are hazardous, and epoxies are prone to yellowing over time.

It would be desirable to provide a dry-erase coating composition that is suitable for consumer application. For example, a homeowner, school, or office manager might wish to coat an interior wall surface with such a coating composition to thereby create a dry-erase "wall," or portion of a wall surface. Ideally, such a dry-erase coating composition would have a low VOC concentration (less than 150 grams/liter), and would be a single-component (or "1K") composition that did not require pre-mixing by the consumer. The coating composition ideally would be suitable for interior architectural surfaces such as wood, drywall, cement, metal, and plaster, or over a primer coating. The dry-erase coating composition should cure at ambient temperature and without ancillary equipment such as ultraviolet lights. Upon curing, the coating composition should form a smooth, hard dry-erase coating that is resistant to interior moisture and humidity, and that is compatible with conventional dry-erase markers.

SUMMARY

In various nonexclusive embodiments, the present application provides a coating composition, a method for making a coating composition, a method of applying a coating composition, a cured coating, and a method of marking a surface.

It has now been discovered that a dry erase coating composition may be made by providing an aminoalkoxysilane and, in the substantial absence of water and in any suitable order, reacting a portion of the aminoalkoxysilane with a carbonate and reacting a portion of the aminoalkoxysilane with an epoxy compound. These reactions will yield a mixture of alkoxysilylamines and alkoxysilylcarbamates. An alkylamine may also be provided in an amount effective to catalytically deprotect alkoxy groups in the alkoxysilylamines and alkoxysilylcarbamates to yield silanol groups.

The mixture of alkoxysilylamines and alkoxysilylcarbamates when blended with the alkylamine may together constitute a coating composition that, upon curing by exposure to water in air, forms a dry-erase coating. The coating composition can be formulated such that the dry-erase coating that is formed is smooth, hard, moisture-resistant, durable, and compatible with conventional dry-erase ink formulations.

In some embodiments, the aminoalkoxysilane can have a structure represented by the following formula (1):

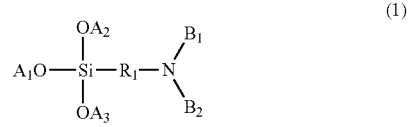

where $A_1$, $A_2$, and $A_3$ are the same or different and comprise hydrogen or $C_1$-$C_4$ alkyl, with the proviso that at least one of $A_1$, $A_2$, and $A_3$ comprises $C_1$-$C_4$ alkyl, where $B_1$ and $B_2$ are the same or different and comprise hydrogen or $C_1$-$C_4$ alkyl, with the proviso that at least one of $B_1$ and $B_2$ is hydrogen, and where $R_1$ is $C_1$-$C_4$ alkyl.

In some embodiments, the carbonate can have a formula according to the following formula (2):

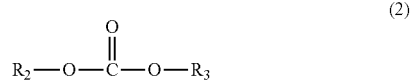

$R_2$ and $R_3$ each independently including an alkyl group, or $R_2$ and $R_3$ forming a cyclic structure that may include any one or more of an alkyl group, a hydroxyalkyl group, and a hydroxyl group as substituents.

In some embodiments, the epoxy compound can have the following formula (8)

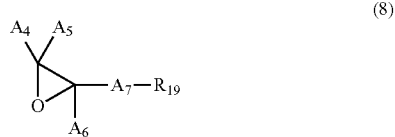

wherein $A_4$-$A_6$ are the same or different and comprise hydrogen or a carbon-containing group with one to three carbon atoms, $A_7$ is a carbonyl-containing linking group, and $R_{19}$ is an aliphatic group having at least four carbon atoms.

In one aspect, a coating composition prepared in accordance with the above method is provided. In another aspect, not mutually exclusive, the mixture of alkoxysilylamines and alkoxysilyl carbamates of the coating composition comprises at least two of (10), (11), and (12):

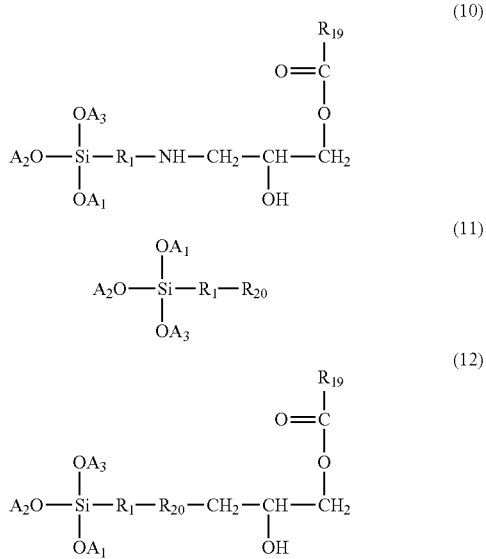

where $A_1$, $A_2$, and $A_3$ are the same or different and comprise hydrogen or $C_1$-$C_4$ alkyl, with the proviso that at least one of $A_1$, $A_2$, and $A_3$ comprises $C_1$-$C_4$ alkyl, where $R_1$ is $C_1$-$C_4$ alkyl, and wherein $R_{20}$ is a hydroxyalkyl carbamate. The composition may be a 100% solids composition, i.e., solvent-free or essentially so.

As described in more detail below, the coating compositions will cure to form a coating composition, the cured coating composition being within another aspect of the present application. Also provided herein are methods of applying a coating composition and methods of marking a surface. These methods employ the novel coating composition and cured coating provided herein respectively, and are otherwise conventional.

DETAILED DESCRIPTION

When prepared in accordance with the present teachings, it is possible to provide a dry-erase coating composition that has several desirable attributes. The coating composition can be an aqueous 1K coating composition that can have a low VOC content (less than 150 grams/liter; in some embodiments less than 125 grams/liter; in some embodiments less than 100 grams/liter; in some embodiments less than 75 grams/liter; in some embodiments less than 50 grams/liter; in some embodiments less than 25 grams/liter) and in some instances essentially zero VOC content (less than 5 grams/liter). The composition can be a 100% solids composition, by which is contemplated that the composition is free or essentially free of solvents. The cure time of the composition can be on the order of 24 hours or less. Upon curing, the cured coating can exhibit excellent marker appearance and marker removal property, with minimal ghosting. The coating will be resistant to acetone and isopropanol, which are common whiteboard cleaning solvents, and also will be resistant to water. The composition can be formulated to have at least a 12-month shelf life. Notably, these attributes are not limiting and it is possible to formulate a coating composition in accordance with the present teachings that lacks some or all of the above attributes.

The coating compositions described herein are based on alkoxysilane technology. When used at high levels, alkoxysilanes can create a low surface energy film that reduces the chances of foreign bodies adhering to the surface. Alkoxysilanes also advantageously promote adhesion to multiple types of surfaces, and incorporate substantial crosslinking to resist penetration of marker ink. The crosslinked cured composition results in a non-porous layer on a surface on which the coating is applied.

Generally, in preparing a coating composition, an aminoalkoxysilane, a carbonate, and an epoxy compound are provided, wherein a portion of the aminoalkoxysilane reacts with the carbonate and a portion of the aminoalkoxysilane reacts with the epoxy compound. These reactions, which may occur in any suitable order, yield a mixture of alkoxysilylamines and alkoxysilylcarbamates. The reactions may occur in the substantial absence of water or any other solvent to produce a coating composition having a solids content of 80% or more, 85% or more, 90% or more, 95% or more, 97% or more, 98% or more, 99% or more, and substantially 100%, based on the total amount of the coating composition.

The reactions may generally occur in any order and/or simultaneously. For example, the method may comprise combining the epoxy compound and the aminoalkoxysilane to form a reacted blend, and then subsequently combining the carbonate with the blend. Alternatively, the method may include combining the carbonate and the aminoalkoxysilane to form a reacted blend, and then combining the epoxy compound and the blend. In yet other instances, the method may include simultaneously combining the carbonate, the aminoalkoxysilane, and the epoxy compound to form a reacted blend.

In exemplary methods, the reaction between the aminoalkoxysilane and the carbonate may occur for 45 to 180 minutes, 90 to 160 minutes, or 110 to 130 minutes, and the reaction between the aminoalkoxysilane and the epoxy compound may occur for 15 to 165 minutes, 60 to 120 minutes, or 75 to 90 minutes. The reactants may be mixed during the reactions. Generally, the reactions between the aminoalkoxysilane and the carbonate and between the aminoalkoxysilane and the epoxy compound may both occur at a suitable temperature and pressure, and in practice, it has desirably been found that satisfactory results can be obtained at room temperature (20-25° C.) and at approximately 101 kPa.

In exemplary coating compositions, the aminoalkoxysilane can be present in an amount of 1.0 to 3.0 parts, 1.5 to 2.5 parts, or 1.75 to 2.25 parts, the epoxy compound can be present in an amount of 0.25 to 2.0 parts, 0.5 to 1.5 parts, or 0.75 to 1.25 parts, and the carbonate can be present in an amount of 0.5 to 2.5 parts, 1.0 to 2.0 parts, or 1.25 to 1.75 parts, relative to one another in the reaction blend.

Any suitable aminoalkoxysilane may be employed, and for example, the aminoalkoxysilane may have a structure represented by the following general formula (1):

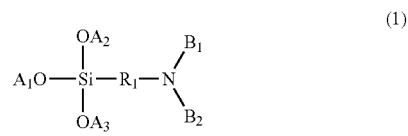

where $A_1$, $A_2$, and $A_3$ are the same or different and comprise hydrogen or $C_1$-$C_4$ alkyl, with the proviso that at least one of $A_1$, $A_2$, and $A_3$ comprises $C_1$-$C_4$ alkyl, where $B_1$ and $B_2$ are the same or different and comprise hydrogen or $C_1$-$C_4$ alkyl, with the proviso that at least one of $B_1$ and $B_2$ is hydrogen, and where $R_1$ is $C_1$-$C_4$ alkyl. In some aspects, $A_1$, $A_2$, and $A_3$ each comprises $C_1$-$C_4$ alkyl. For example, the aminoalkoxysilane may comprise an aminopropyl trialkoxysilane, such as aminopropyl trimethoxysilane (sold as Dynasylan® AMMO from Evonik Industries).

Any suitable carbonate may be employed. In preferred aspects, the carbonate has a general formula according to the following formula (2):

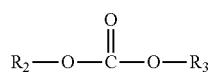

(2)

$R_2$ and $R_3$ each independently including an alkyl group (with or without terminal hydroxyl groups), or $R_2$ and $R_3$ forming a cyclic structure that may include any one or more of an alkyl group, a hydroxyalkyl group, and a hydroxyl group as substituents. In some embodiments, the cyclic carbonate may have an empirical formula of $C_{(3+y)}H_{(4+2y)}O_4$, where y is an integer of up to four. The carbonate may, for example, comprise a carbonate having the following formula:

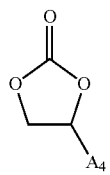

where $A_4$ indicates an alkyl group, a hydroxyalkyl group, or a hydroxyl group. An example of a suitable carbonate is glycerol carbonate:

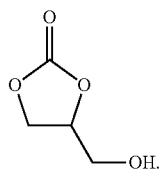

Any suitable epoxy compound may be employed. An exemplary epoxy compound may have a structure represented by the following general formula (8):

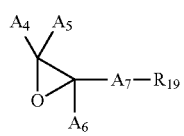

(8)

wherein $A_4$-$A_6$ are the same or different and comprise hydrogen or a carbon-containing group with one to three carbon atoms, $A_7$ is a carbonyl-containing linking group, and $R_{19}$ is an aliphatic group having at least four carbon atoms.

In some embodiments, the epoxy compound may comprise a glycidyl aliphatic ester. An exemplary glycidyl aliphatic ester can have the following general formula (9):

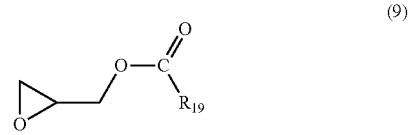

(9)

wherein $R_{19}$ is an aliphatic group having at least four carbon atoms. For example, a glycidyl aliphatic ester useful in preparing the coating composition has the following formula:

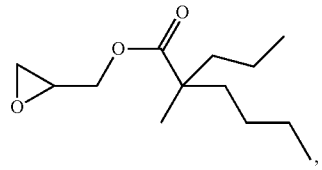 [SMILES: CCCCC(C)(CCC)C(=O)OCC1CO1]

which is sold as Cardura™ E10-P by Hexion, Inc.

In some embodiments, the epoxy compound may comprise a glycidyl aliphatic ether. An exemplary glycidyl aliphatic ether has the following formula:

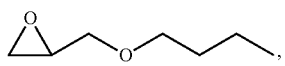

which is sold as Erisys® GE-5 by CVC Thermoset Specialties.

The reactions between the aminoalkoxysilane and the carbonate and between the aminoalkoxysilane and the epoxy compound can yield a mixture of alkoxysilylamines and alkoxysilylcarbamates. In some instances, the method of making the coating composition can yield a mixture of alkoxysilylamines and alkoxysilylcarbamates comprising at least two of the following compounds (10), (11), and (12):

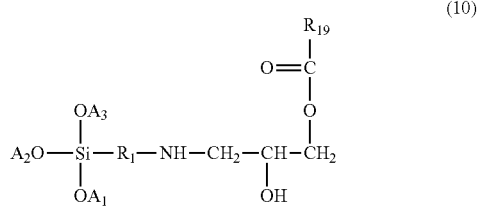

(10)

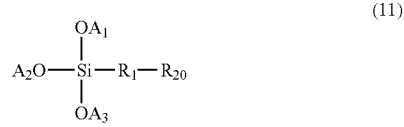

(11)

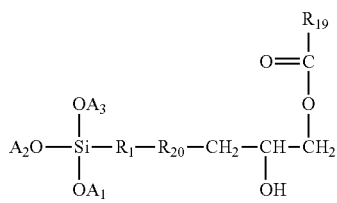

where $A_1$, $A_2$, and $A_3$ are the same or different and comprise hydrogen or $C_1$-$C_4$ alkyl, with the proviso that at least one of $A_1$, $A_2$, and $A_3$ comprises $C_1$-$C_4$ alkyl, where $R_1$ is $C_1$-$C_4$ alkyl, and $R_{20}$ is a hydroxyalkylcarbamate. $A_1$, $A_2$, and $A_3$ may each comprise the same or different $C_1$-$C_4$ alkyl, such as methyl. In some instances, $R_{20}$ comprises a derivative from reacting an amino group with glycerol carbonate. The method is also capable of yielding a coating composition comprising a mixture of alkoxysilylamines and alkoxysilyl-carbamates comprising all three of general formulas (10), (11), and (12).

In the coating composition, compound (10) may be present, for example, in an amount of 0.7 to 1.3 parts, compound (11) may be present in an amount of 1.0 to 1.3 parts, and compound (12) may be present in an amount of 0.0 to 0.5 parts, relative to one another. In some embodiments, the coating composition consists essentially of two or more of (10), (11), and (12), optionally including pigments and other modifiers, but without substantial amounts of water or other solvents.

In an embodiment of the method making the coating composition, a portion of aminopropyl trimethoxysilane reacts with Cardura™ E10-P and a portion of aminopropyl trimethoxysilane reacts with glycerol carbonate to produce a mixture of alkoxysilylamines and carbamates comprising at least two of (13), (14), (15):

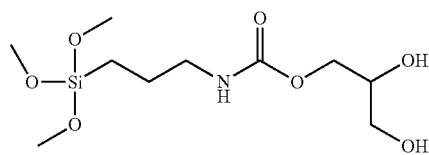

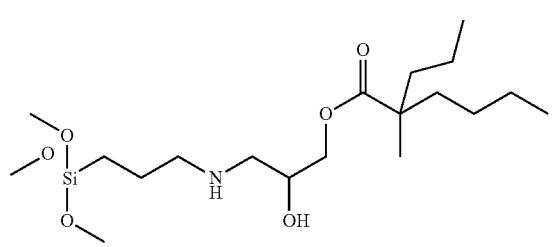

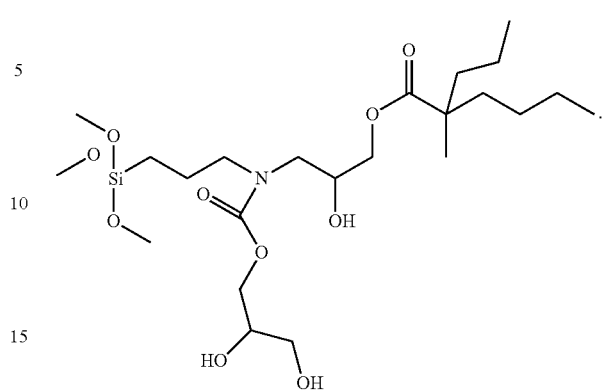

These components are believed to function as crosslinkers in the 1K coating composition.

The coating composition is a 1K technology that has long term shelf stability, yet that is capable of forming siloxane bonds effectively. Insofar as the present application discloses aspects other than the method for preparing the coating composition, it should be noted that the above reactions are not limiting, however, because there are other ways to create the above crosslinkers.

It is generally believed that, during a process of curing the coating composition, the alkoxy groups present in the crosslinkers at least partially hydrolyze when exposed to water in air. As these hydrolysis reactions occur, the alkoxy groups convert to silanol groups. It is also believed that at least a portion of the silanol groups cross-link together to form siloxane linkages. This curing process produces a highly cross-linked cured coating that exhibits dry-erase properties. The hydrolysis reactions may also produce water and one or more types of alcohol, which may evaporate from the coating composition. While alcohol may be considered VOC, it is generally believed that the amount of alcohol produced during the curing process is substantially lower than the amounts of VOCs that are produced during curing of an organic solvent-based coating composition.

It is generally believed that the crosslinkers may, in some instances, include hydrophobic structures that slow the progress of a hydrolysis reaction between water and the alkoxy groups. To resolve this problem, an alkylamine may also be provided in the coating composition in an amount effective to catalytically deprotect alkoxy groups in the alkoxysilylamines and alkoxycarbamates to yield silanol groups. The alkylamine can accelerate the production of the silanol groups during curing of the coating composition. For example, without intending to be bound by any particular theory, it is believed that the alkylamine may catalytically deprotect the alkoxy groups according to the following reaction:

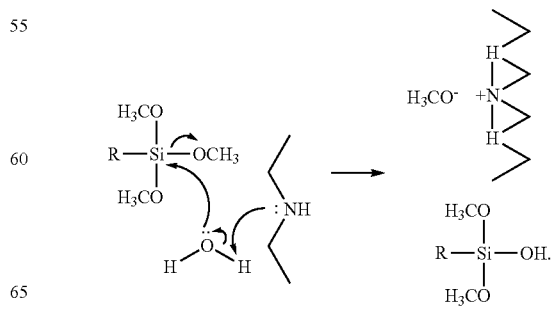

Any suitable alkylamine may be provided in the coating composition. Exemplary secondary and tertiary amines include di and trimethyl amine, di and triethyl amine, di and tripropyl amine, di and tributyl amine, di and tripentyl amine, di and trihexyl amine, n-ethylmethylamine, n-ethylpropylamine, n-ethylbutylamine, n-ethylpentylamine, n-methylpropylamine, n-propylbutylamine, n-pentylpropylamine, n-butylmethylamine, n-butylpentylamine, n-butylhexylamine, n-pentylhexylamine, n-isopropylmethylamine, n-methylisobutylamine, ethylisobutylamine, diisobutyl amine, and diisopropyl amine. In exemplary coating compositions, the alkylamine can be included in an amount of 0.15 wt % based on the total amount of the coating composition.

The coating composition may include other functional ingredients in amounts intended for their effective purposes. For example, the coating composition may contain a colorant, such as a pigment. Desirably, when the coating composition is intended for use as a whiteboard paint, the pigment may be titanium dioxide. The colorant may be present in any amount suitable to impart color and covering effect to the finished coating; for example, when the pigment is titanium dioxide, it may be present in an amount ranging from 5 to 30% by weight of the composition. Other suitable pigments include any suitable pigment particles, such as azo pigments, anazurite, aluminum silicate, aluminum potassium silicate, aluminum paste, anthraquinone pigments, antimony oxide, barium metaborate, barium sulfate, calcium carbonate, calcium metaborate, calcium metasilicate, carbon black, chromium oxides, clay, copper oxides, copper oxychloride, dioxazine pigments, feldspar, hansa yellows, iron oxides such as yellow and red iron oxides, isoindoline pigments, kaolinite, lithopone, magnesium silicates, metallic flakes, mica, napthol pigments such as napthol reds, nitroso pigments, nepheline syenite, perinone pigments, perylene pigments, polycyclic pigments, pyrropyrrol pigments, pthalocyanines such as copper pthalocyanine blue and copper pthalocyanine green, quinacridones such as quinacridone violets, quinophthalone pigments, silicates, sulfides, talc, titanium dioxide, ultramarine, zinc chromate, zinc oxide, and zinc phosphate. In addition, pearlescents, optical brighteners, ultraviolet stabilizers, and the like may be employed. Colored pigments ordinarily would not be employed for whiteboard paint, but could be used in other applications.

The composition further may include a plasticizer to improve water sensitivity. It is believed that exposure of the cured coating to water may tend to increase crosslinking via post-core drift, thus hardening the film and making the film susceptible to cracking. A flexible plasticizer or spacer may be added to at least partially inhibit additional silanol crosslinking. One suitable spacer is polyethylene glycol (such as PEG8000). The spacer may be used in any amount ranging up to about 10% by weight of the coating composition. Above this amount, the film may dissolve when exposed to water or may become undesirably soft. The coating composition also may include any one or more of dispersants, surfactants, wetting agents, synergists, and rheology modifiers. Any suitable dispersant, such as any one or more of anionic dispersants, cationic dispersants, amphoteric dispersants, or nonionic dispersants may be used in conjunction with a pigment vehicle. Other known dispersants believed to be suitable include Nuosperse® 657 and Nuosperse® FA 196 available from Elementis Specialties, Disperbyk 108 available from Altana AG, and Solsperse™ M387 available from Lubrizol Corporation. Similarly, any suitable wetting agents such as any one or more of anionic wetting agents, cationic wetting agents, amphoteric wetting agents, or nonionic wetting agents may be used. An exemplary synergist is Solsperse™ 5000 available from Lubrizol Corporation. Exemplary rheology modifiers include Suspeno 201-MS available from Poly-Resyn, Inc. and Aerosil® available from Evonik Industries.

Once formed, the coating composition may be applied immediately to a substrate, but the coating composition also may be dispensed into a suitable container, such as a paint can, and sealed. It is believed that the coating composition will have a shelf life of at least twelve months.

A method of applying a coating composition can comprise applying the coating composition to a substrate, and allowing the coating composition to cure. Once applied to the substrate, the coating composition will cure as the composition crosslinks. The curing process does not require additional equipment (e.g., a UV source), but rather the curing occurs when the coating composition is exposed to air containing water.

The coating composition may be employed for any suitable purpose. In certain embodiments, the coating composition may be applied to a surface in order to impart dry-erase characteristics. For example, the surface may be a wall, which may have paint or a primer already applied to the surface of the wall, over which the coating can be applied. The coating composition may be applied with brush, roller, sponge, or spray gun, or other conventional painting tool. The cured coating may have any suitable thickness, such as a thickness ranging from 0.05-2 mm with preferred thickness around 0.1 mm.

The high amount of crosslinking that occurs during curing of the coating composition is believed to provide a coating that has a low porosity. The low porosity increases the durability of the coating, the resistance of the coating to water, and the resistance of the coating to marker ghosting.

When the coating composition is applied to a surface, and allowed to successfully cure, a dry-erase marker may be used to mark the surface of the coating. As the siloxane linkage (via self-crosslinking) has lower surface energy than that of the marker ink, and the porosity of the coating is greatly reduced through crosslinking, the ink from the dry-erase marker does not penetrate into the cured coating.

Accordingly, the dry-erase marker ink can be successfully removed by wiping without a cleaning solution or using a commercially available dry-erase cleaner that includes chemicals (e.g., water, propylene glycol n-butyl ether, and/or isopropyl alcohol). In addition, the coating may be able to resist a ghosting effect when marker ink is left on the surface for up to nine days, due to the low porosity.

EXAMPLES

Example 1

A mixture of alkoxysilylamines and alkoxysilylcarbamates was produced by reacting 48% of Dynasylan® AMMO and 30% of Cardura™ E10-P in a flask, mixing and reacting the contents of the flask for 120 minutes, and then adding 22% of glycerol carbonate to the flask and further mixing and reacting the contents of the flask for an additional 120 minutes. After the addition of the glycerol carbonate, an exothermic reaction was observed and the viscosity of the contents of the flask began to increase over the 120 minute reaction period.

Example 2

A mixture of alkoxysilylamines and alkoxysilylcarbamates was produced by reacting 48% of Dynasylan® AMMO and 22% of glycerol carbonate in a flask, mixing and reacting the contents of the flask for 120 minutes, and then adding 30% of Cardura™ E10-P to the flask and further mixing and reacting the contents of the flask for an additional 120 minutes.

Examples 3 and 4

Examples 1 and 2 are repeated, except that 0.15 wt % of dibutyl amine is Example 1 to form Example 3, and 0.15 of dibutyl amine is added to Example 2 to form Example 4.

Example 5

A mixture of alkoxysilylamines and alkoxysilylcarbamates is produced by reacting 47% of Dynasylan® AMMO and 22% of glycerol carbonate in a flask, mixing and reacting the contents of the flask for 120 minutes, and then adding 30% of Erisys® GE-5 to the flask and further mixing and reacting the contents of the flask for an additional 120 minutes. Subsequently, 0.15% of dibutyl amine is added to the flask.

Curing Time

Films of Examples 1 and 2 were applied to separate Leneta testing charts and allowed to cure. A minimum curing period of 3 days was required before testing. However, an optimal curing period of 7 days was allowed before testing the water sensitivity and dry-erase properties of the cured coatings of Examples 1 and 2.

Water Resistance Test 1

At laboratory temperature (ambient conditions (25 C+/−3 degrees) and humidity was 50%+/−5%, water was dropped onto a horizontal Leneta chart covered with the cured coatings of Examples 1-2, and the tested areas were covered with a medicine cup to prevent evaporation for a duration 1 to 24 hours. The cured films of Examples 1-2 demonstrated no blushing or degradation after exposure to water for up to 24 hours. Upon removal of water from the films of Examples 1-2, the films remained hard with no blistering, cracking, or delamination.

Example 5 was tested in the same manner as Examples 1-2, but Example 5 provided inferior water resistance properties when compared with Examples 1-2, which is due to the shorter hydrophobic aliphatic tails compared to Examples 1-2.

Water Resistance Test 2

At laboratory temperature (ambient conditions (25 C+/−3 degrees) and humidity was 50%+/−5%, water was sprayed onto a vertical surface (Leneta chart) covered with the cured coatings of Examples 1-2, and the sprayed coatings were immediately allowed to dry. The cured films of Examples 1-4 displayed no blushing, degradation, blistering, cracking, or delamination after a period of 24 hours had lapsed from the time of spraying.

Example 5 was tested in the same manner as Examples 1-2, but Example 5 provided inferior water resistance properties when compared with Examples 1-2, which is due to the shorter hydrophobic aliphatic tails compared to Examples 1-2.

Dry-Erase Performance Test

An Expo® Dry-Erase Marker, sold by Newell Brands Company, was used to mark the cured coatings of Examples 1-5. The marking applied to the cured films could immediately be removed with the touch of a finger or by wiping with a paper towel. However, after a period of 4 hours passed from the time of applying the markings, removal of the markings from the cured films of Examples 1, 2, and 5 required rubbing with isopropanol and acetone. It is believed that the markings are drawn to the soft tail of the structure derived from Cardura™ E10-P. It was also observed that the linear structure provided by Erisys® GE-5 did not increase the dry erase, performance of the cured film of Example 5 relative to Examples 1-4.

Stability Test

The cured coatings of Examples 1, 2, and 5 each demonstrated good stability after storage both at room temperature (4 weeks, ambient conditions (25 C+/−3 degrees) and humidity was 50%+/−5%, and in an oven at (4 weeks at 120 F). The cured coatings of Examples 1, 2, and 5 remained clear with a slightly yellow translucent coloration. The cured coatings displayed no visual evidence of precipitation.

Although the above description has focused on the disclosed coating compositions as dry-erase compositions, the compositions are contemplated to have many other uses. For example, the coating composition may be applied to a metal surface, in particular a ferrous surface, to form a rust-resistant or other protective coating layer on the metal surface. The composition may be applied to other surfaces such as concrete, painted or unpainted drywall, or plastics. It is also contemplated that the coating composition may be used as a coalescent aid in water-based paints.

All methods described herein can be performed in any suitable order unless otherwise indicated herein or otherwise clearly contradicted by context. The use of any and all examples, or language describing an example (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. A method of making a coating composition, the method comprising:
providing an aminoalkoxysilane;
in the substantial absence of water, reacting a portion of said aminoalkoxysilane with a carbonate and reacting a portion of said aminoalkoxysilane with an epoxy compound of the following formula (8)

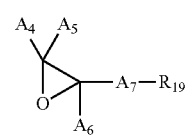

(8)

wherein $A_4$-$A_6$ are the same or different and comprise hydrogen or a carbon-containing group with one to three carbon atoms, $A_7$ is a carbonyl-containing linking group, and $R_{19}$ is an aliphatic group having at least four carbon atoms; and the reactions yielding a mixture of alkoxysilylamines and alkoxysilylcarbamates;

the method including providing an alkylamine in an amount effective to catalytically deprotect alkoxy groups in said alkoxysilylamines to yield silanol groups.

2. The method according to claim 1, the method comprising:

adding said epoxy compound to said aminoalkoxysilane to form a reacted blend, and subsequently adding said carbonate to said blend.

3. The method according to claim 1, said aminoalkoxysilane being present in an amount of 1.5 to 2.5 parts, said epoxy compound being present in an amount of 0.5 to 1.5 parts, and said carbonate being present in an amount of 1.0 to 2.0 parts, relative to one another.

4. The method according to claim 1, said epoxy compound comprising a glycidyl aliphatic ester.

5. The method according to claim 4, the glycidyl aliphatic ester having the following formula (9)

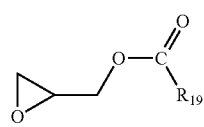

(9)

wherein $R_{19}$ is an aliphatic group having at least four carbon atoms.

6. The method according to claim 1, the aminoalkoxysilane having a structure represented by the following formula (1):

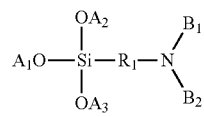

(1)

where $A_1$, $A_2$, and $A_3$ are the same or different and comprise hydrogen or $C_1$-$C_4$ alkyl, with the proviso that at least one of $A_1$, $A_2$, and $A_3$ comprises $C_1$-$C_4$ alkyl, where $B_1$ and $B_2$ are the same or different and comprise hydrogen or $C_1$-$C_4$ alkyl, with the proviso that at least one of $B_1$ and $B_2$ is hydrogen, and where $R_1$ is $C_1$-$C_4$ alkyl.

7. The method according to claim 6, the aminoalkoxysilane comprising an aminopropyl trialkoxysilane.

8. The method according to claim 2, the aminoalkoxysilane comprising aminopropyl trimethoxysilane.

9. The method according to claim 1, said mixture of alkoxysilylamines and alkoxylsilylcarbamates comprising at least two of (10), (11), and (12):

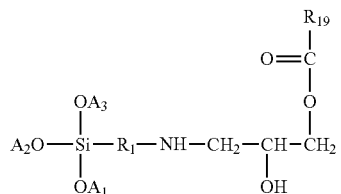

(10)

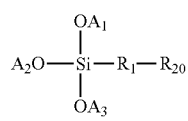

(11)

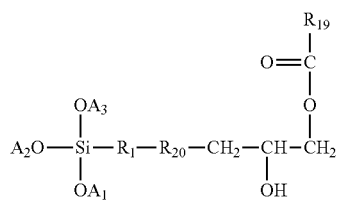

(12)

where $A_1$, $A_2$, and $A_3$ are the same or different and comprise hydrogen or $C_1$-$C_4$ alkyl, with the proviso that at least one of $A_1$, $A_2$, and $A_3$ comprises $C_1$-$C_4$ alkyl, where $R_1$ is $C_1$-$C_4$ alkyl, and wherein $R_{20}$ is a hydroxyalkylcarbamate.

10. The method according to claim 9, said mixture of alkoxysilylamines and alkoxylsilylcarbamates comprising a mixture of all three of (10), (11), and (12).

11. The method according to claim 9, said mixture of alkoxysilylamines and alkoxysilylcarbamates comprising at least two of (13), (14), (15):

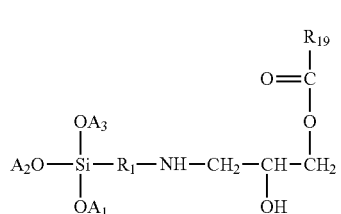

(13)

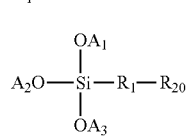

(14)

and

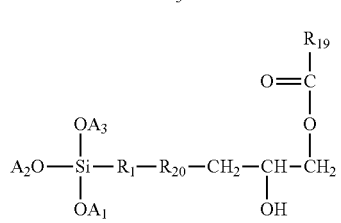

(15)

12. The method according to claim 1, the carbonate having a formula according to the following formula (2):

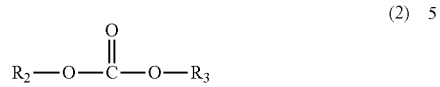

(2)

$R_2$ and $R_3$ each independently including an alkyl group, or $R_2$ and $R_3$ forming a cyclic structure that may include any one or more of an alkyl group, a hydroxyalkyl group, and a hydroxyl group as substituents.

13. The method according to claim 12, the carbonate comprising glycerol carbonate.

14. The method according to claim 1, the alkylamine comprising dibutyl amine.

15. The method according to claim 1, further including adding a spacer.

16. The method according to claim 15, said spacer comprising polyethylene glycol.

17. The method according to claim 1, further including adding a pigment.

18. The method according to claim 17, the pigment including titanium dioxide.

* * * * *